United States Patent Office 2,758,913
Patented Aug. 14, 1956

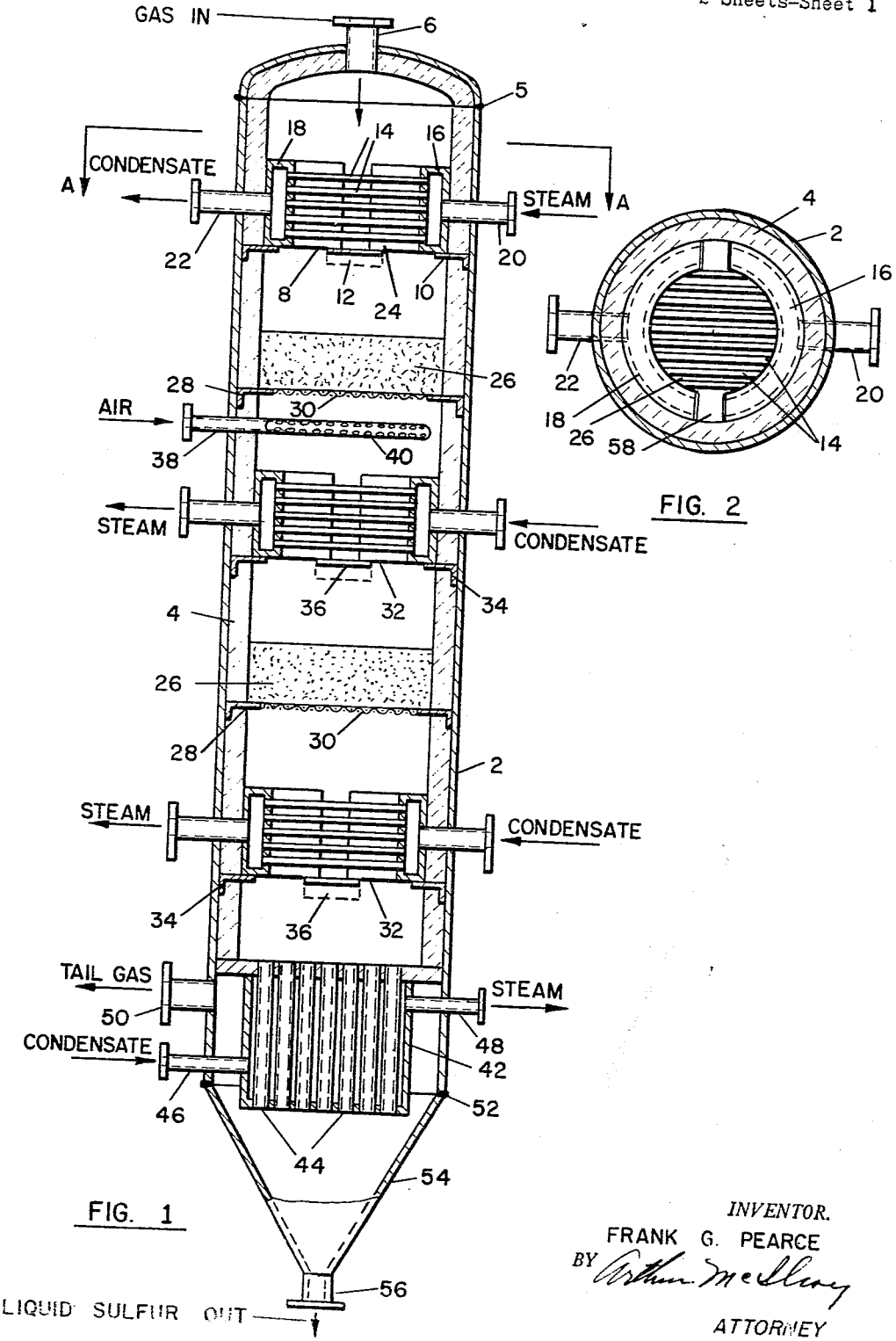

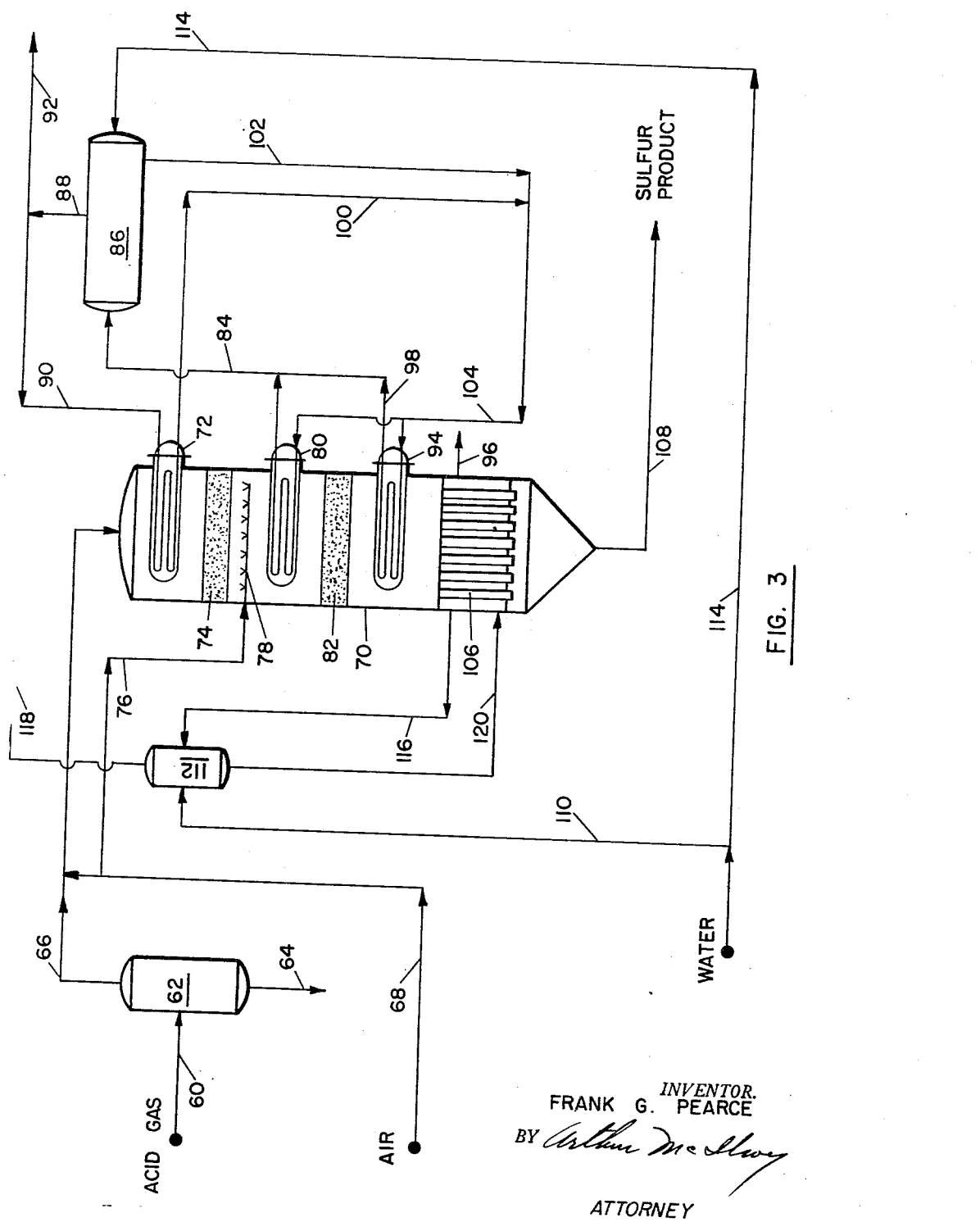

2,758,913

PROCESS FOR SULFUR RECOVERY

Frank G. Pearce, Tulsa, Okla., assignor to Stanolind Oil and Gas Company, Tulsa, Okla., a corporation of Delaware Application October 11, 1951, Serial No. 250,908

11 Claims. (Cl. 23—225)

The present invention relates to the recovery of sulfur from hydrogen sulfide-containing gases. More particularly, it pertains to apparatus and methods for recovering sulfur from hydrogen sulfide-containing gases by direct oxidation of the hydrogen sulfide to free or elemental sulfur by means of air or other gases containing free oxygen.

Numerous methods have been proposed in the past for recovering sulfur from gases relatively rich in hydrogen sulfide; however, in so far as I am aware, none of such procedures has been substantially free from a variety of technical or economic objections. For example, with procedures involving the direct oxidation of hydrogen sulfide to free sulfur, a reaction which is highly exothermic, it has been proposed to overcome the attendant heat transfer problems by effecting the reaction in a fluidized catalyst bed. While this technique does tend to hold reaction temperatures within the desired range, the catalyst itself is entrained in relatively large amounts with the product sulfur thus produced. Also, operations on a commercial scale employing such a process require large reactors and consequently relatively high initial investment costs.

Processes now commercially employed are based on the following reactions:

(1)          $2H_2S + 3O_2 \rightarrow 2SO_2 + 2H_2O$ (2)          $SO_2 + 2H_2S \rightarrow 3S + 2H_2O$

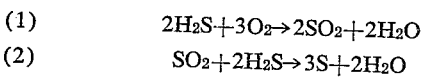

In carrying out a process employing the above combination of reactions, one third of the total feed stream is diverted to a furnace where it is mixed with air under conditions such that sulfur dioxide and water are the principal products in accordance with Reaction 1. The furnace combustion products are then combined with the remaining two thirds of the aforesaid feed stream and conducted into a separate converter of considerable size where reaction occurs in accordance with Equation 2. Because the reaction illustrated by Equation 2 is relatively slow, compared to the reaction involving the direct combustion of hydrogen sulfide to free sulfur, the converters employed necessarily must be much larger than those required in the direct oxidation of hydrogen sulfide to obtain an equivalent quantity of product sulfur. Moreover, two such converters are ordinarily required, the second being employed to clean up unreacted hydrogen sulfide present in the tail gas from the first reactor. Owing to the inherent complexity of such a system, the initial investment cost for a commercial plant employing this two-stage process is relatively high.

Accordingly, it is an object of my invention to provide a unique converter design whereby sulfur may be recovered from hydrogen sulfide-containing gases in a highly efficient manner and at a relatively low plant investment cost. It is a still further object of my invention to employ the aforesaid unique apparatus design in recovering sulfur from hydrogen sulfide-containing gases of rather widely varying composition.

In accordance with one embodiment of my invention, gases containing up to about 25 volume per cent hydrogen sulfide are mixed with oxygen, preferably in the form of air, after which the resulting mixture is introduced into an elongated converter, for example of the type shown in Figure 1, which will be described in detail below. The mixture of hydrogen sulfide-containing gases and oxygen is then preheated to a temperature at least sufficiently high to initiate the reaction when these gases come in contact with the catalyst. This particular temperature, however, will be found to vary to some extent with the catalyst utilized. In general, it may be said that preheat temperatures in the range of from about 300° to about 500° F. may be successfully employed, with temperatures ranging from about 375° to about 425° F. ordinarily being preferred. After the gaseous mixture is preheated to the desired temperature, it is passed through a suitable catalyst bed where the hydrogen sulfide is largely converted to free sulfur. The temperature within the catalyst bed should be sufficiently high to cause vaporization of the sulfur from the catalyst as it is formed. In other words, the temperature of the reaction zone or catalyst bed should always be above the dew point of the sulfur vapors present therein. This reaction may be allowed to proceed at temperatures from about 300° to about 1,200° F., but generally it is preferable to operate at temperatures of from about 375° to about 1,000° F. Temperatures above 1,200° F. are generally to be avoided, particularly where the hydrogen sulfide in the feed stream is mixed with natural gas or equivalent hydrocarbon components. Gas velocities of from about 1,000 to about 40,000 vols./hr./vol. (S. T. P.) of catalyst and preferably from about 10,000 to about 15,000 vols./hr./vol. of catalyst may be employed.

With feed gases containing about 10 volume per cent or less of hydrogen sulfide, I have found that under the conditions outlined above, over-all conversions of hydrogen sulfide of 70 to 80 per cent are obtained with the selectivity to free sulfur ranging from about 92 to about 98 per cent. Gases having hydrogen sulfide concentrations of from about 10 to not more than about 25 volume per cent, are rapidly converted to free sulfur. However, because of the substantial quantity of hydrogen sulfide present and the fact that the reaction involved is highly exothermic, reaction temperatures are frequently difficult to control. Accordingly, with gases relatively rich in hydrogen sulfide, it is desirable to mix initially less oxygen therewith than is theoretically required. Generally it is preferred to add at this point approximately 60 to 70 per cent of the total oxygen required. After the resulting mixture has been passed through the first catalyst bed, the product gases containing unconverted hydrogen sulfide are then preferably mixed with sufficient additional oxygen to convert substantially completely the remainder of the hydrogen sulfide present to free sulfur. The resulting mixture of hot gases is next suitably cooled down to a temperature ranging from slightly above the dew point of the sulfur vapor contained therein to about 625° F. While the dew point of the sulfur vapors present in the gases at this stage of my process is in the neighborhood of about 400° F., it will, of course, be appreciated that this figure varies with the concentration of the sulfur vapors issuing from the first catalyst bed. The cooled gaseous mixture of sulfur vapors, unconverted hydrogen sulfide, air, etc., is then passed into a second catalyst bed where the reaction is carried to completion after which the gas is cooled for steam generation and finally sulfur condensation.

The catalyst employed may be any of those previously used to promote the oxidation of hydrogen sulfide to free sulfur such as, for example, silica gel or other forms of finely divided silica containing minor portions of suitable activators. Also the oxides of boron, sodium and potassium may be used. Generally, however, I prefer to use bauxite in any of its various forms commercially available.

The catalyst may be employed as such, or it may be deposited on a suitable support such as, for example, kieselguhr, activated carbon, diatomaceous earth, etc. While more than two catalyst beds may, if desired, be employed in my converter design, together with additional cooling means operating in conjunction therewith, I have found that with the gas streams investigated by me such additional equipment is unnecessary. Moreover, the additional expense for extra catalyst and cooling beds would, in general, be difficult to justify.

One of the outstanding features of the reactor design of my invention is its ready adaptability to a wide variety of feed gases of varying hydrogen sulfide concentrations. Thus, gases ranging in hydrogen sulfide content from as low as about 1 per cent to as high as about 25 volume per cent may be employed. The remaining components of the feed stream are relatively unimportant and may, for example, contain large quantities of light hydrocarbons and/or carbon dioxide. By operating at maximum temperatures not in excess of 1,000° to 1,200° F., little or no combustion of the hydrocarbons occurs during the oxidation of hydrogen sulfide to free sulfur in accordance with my invention, thereby affording a cheap and convenient method for removing objectionable impurities from natural gas or other streams of light hydrocarbons prior to employing them for various of their well known uses.

A preferred design of the converter covered by the present invention is shown in Figures 1 and 2 of the drawings. The converter comprises an outer cylindrical metal shell 2, having an internal insulation of a suitable refractory material 4, such as fire brick. The top of the reactor is welded to the sides of the shell at 5 and is provided with a gas inlet tube 6, through which gaseous mixtures of air or other suitable oxygen-containing gas and hydrogen sulfide-containing gases are conducted to exchanger 8, supported by angle irons 10 and 12. Heat exchanger 8 is composed of tube bundle 14, the ends of which are attached to headers 16 and 18 integral with steam inlet 20 and condensate outlet 22, respectively. Headers 16 and 18 are in the form of cylindrical segments and define a generally cylindrical passageway 24, through which the heated gaseous reaction mixture passes. Catalyst beds 26 are supported by angle irons 28 and stainless steel wire grids 30. Alternately spaced with respect to feed catalyst beds 26, are heat exchangers 32 identical in structure with heat exchanger 8. These exchangers are likewise secured to the walls of the reactor by means of angle irons 34 and 36. Below the first of catalyst beds 26 is an inlet 38 affixed to a gas distributor 40 through which air or other suitable oxygen-containing gas may be injected into the reactor and mixed with hydrogen sulfide-containing gases from the exit side of said first catalyst bed 26. Beneath the second of said exchangers 32 is a condenser 42, having cooling channels 44. Condensate water flows through inlet 46, converted into low-pressure steam and withdrawn through outlet 48. Uncondensed tail gas is removed from the system through outlet 50. Welded to cylindrical shell 2 at 52 is an inverted cone shaped base 54, having a withdrawal port 56.

Figure 2 is a plan view of a section of Figure 1 taken along the line A—A showing headers 16 and 18 as being in the shape of substantially cylindrical segments separated by space 58 and defining a cylindrical passageway 24 in which the gaseous mixture may be brought into heat exchange relationship with tube bundle 14.

While the reactor design represented by Figure 1 shows alternately spaced catalyst and cooling beds, this structure can be modified in a number of ways and still remain within the scope of my invention. For example, a multiple tube-type reactor may be employed in which the tubes are filled with catalyst and a suitable heat exchange medium is circulated about the tubes; or the spaces between the tubes may be filled with catalyst, and a coolant passed through the tubes. The reactor tubes may also be provided with fins or other similar devices projected from the surface thereof.

The process and apparatus of my invention may be further illustrated by the following specific example carried out in accordance with the sequence indicated in the flow diagram of Figure 3.

*Example*

A gaseous feed stream of 870 cu. ft. of acid gas containing 13.83 per cent hydrogen sulfide and 84.8 per cent carbon dioxide was introduced through line 60 into knockout drum 62 where condensate material was withdrawn through line 64. Condensate gases were withdrawn from drum 62 through line 66 and then mixed with a deficiency of air (232 cu. ft.) added to the system through line 66, and the resulting mixture sent to converter 70. This mixture as it entered converter 70 was raised to a temperature of about 510° F. by passing the gas in heat exchange with heater 72 located directly above the first bed of bauxite catalyst 74.

The resulting hot gaseous mixture was then passed through catalyst bed 74, the extent of the reaction being controlled by by-passing an additional 181 cu. ft. of air from line 68 through line 76 and into the converter where the air was mixed by means of distributor 78 with the gases coming from catalyst bed 74. The space velocity of the total gas stream to converter 70 was 12,480 cu. ft./hr./cu. ft. of catalyst, and the total amount of oxygen added to the system was about 15 per cent in excess of the quantity stoichiometrically required. The resulting mixture of unconverted hydrogen sulfide, sulfur vapors, and added air was cooled from a temperature of about 980° F. down to 610° F. by means of heat exchanger 80 prior to introduction of the gases into the second bed of bauxite catalyst 82. Steam generated by this operation was conducted from the exchanger through line 84 into steam drum 86. High pressure steam (550 to 700 p. s. i.) was then withdrawn through line 88 and a portion thereof returned to converter 70 through line 90 to operate exchanger 72. The remainder of the steam was led off through the system through line 92 for use elsewhere in the plant.

The gases, after passing through catalyst bed 82, had a temperature of 830° F. and were cooled to about 475° F. by means of heat exchanger 94. The tail gases were conducted from the converter through line 96. These gases contained 2.9 per cent hydrogen sulfide and 0.87 per cent sulfur dioxide. Steam generated by the operation of heat exchanger 94 was withdrawn through line 98 and combined with steam in line 84. Heat exchangers 80 and 94 were operated by condensate flowing from exchanger 72 and steam drum 86 through lines 100 and 102, respectively. The streams in these lines were combined and conducted through line 104, approximately equal amounts of the condensate being sent to exchangers 80 and 94. The product gases were next brought into contact with condenser 106 where liquid sulfur passed therefrom at a temperature of about 275° F. The liquid product was withdrawn from converter 70 through line 108 and run into a suitable receiver. Condensate water was added through line 110 to operate both steam drums 112 and 86, coming into the latter through line 114. Low-pressure steam generated through condenser 106 was withdrawn through line 116, led into steam drum 112, and withdrawn through line 118 for use outside the scope of the process of my invention. Condensate water from steam drum 112 was returned to condenser 106 through line 120.

The hydrogen sulfide conversion, when employing the conditions described above, amounted to 79 per cent with a selectivity to free sulfur of 97 per cent. Approximately 85 per cent of the total oxygen added to the system was converted, corresponding actually to practically a 100 per cent conversion of the quantity theoretically required inasmuch as a 15 per cent excess over the theoretical quantity was employed. Under conditions substantially identical with those described above a total of about 600 lbs. of high purity sulfur was produced. The activity of the bauxite catalyst throughout the entire period of operation was substantially unaffected.

It will be apparent to those skilled in the art from the foregoing drawings and example that numerous modifications of my invention exist without departing from the scope thereof as herein defined. Accordingly, any such embodiments are to be construed as coming within the spirit of my invention.

What I claim is:

1. In a process for recovering free sulfur from hydrogen sulfide-containing gases by means of direct oxidation of hydrogen sulfide with a gas containing up to about 25 volume per cent hydrogen sulfide, the steps which comprise mixing said gas with a gas containing free oxygen, said oxygen being present in an amount insufficient to react with all of the hydrogen sulfide in said gases, heating the resulting mixture up to a temperature of from about 300° to about 500° F. and thereafter contacting said mixture with a fixed bed of catalyst capable of promoting the oxidation of hydrogen sulfide to free sulfur wherein the temperature variation across said bed ranges from not less than about 300° F. on the inlet side to not more than about 1,200° F. on the exit side of said bed, withdrawing product gas from said catalyst bed at a temperature in excess of about 980° F. but below about 1200° F., thereafter mixing a sufficient quantity of a gas containing free oxygen to react with the remaining unconverted hydrogen sulfide issuing from said catalyst bed to produce free sulfur, next cooling the resulting gaseous mixture to a temperature ranging from slightly above the dew point of the sulfur vapors contained therein up to about 625° F., conducting the cooled gaseous mixture through a second bed of catalyst for the oxidation of hydrogen sulfide to free sulfur, the temperature variation across said second catalyst bed ranging from not less than slightly above the dew point of the aforesaid sulfur vapors on the inlet side to not more than about 1,200° F. on the exit side of said second catalyst bed, thereafter cooling the resulting sulfur-containing vapors, and withdrawing the cooled product.

2. The process of claim 1 in which the temperature variation across both the first and second catalyst beds ranges from not less than about 375° F. on the inlet side to not more than about 1,000° F. on the exit side of said beds.

3. The process of claim 1 in which the hydrogen sulfide-containing gas is sour natural gas.

4. In a process for recovering free sulfur from hydrogen sulfide-containing gases by means of direct oxidation of hydrogen sulfide with a gas containing from about 10 to about 25 volume per cent hydrogen sulfide, the steps which comprise mixing said gases with a gas containing free oxygen, said oxygen being present in an amount ranging from about 60 to about 70 per cent of that theoretically required to react with all of the hydrogen sulfide present in said gases, heating the resulting mixture up to a temperature of from about 300° to about 500° F. and thereafter contacting said mixture with a fixed bed of catalyst capable of promoting the oxidation of hydrogen sulfide to free sulfur, the temperature variation across said bed ranging from not less than about 300° F. on the inlet side to not more than about 1,200 F. on the exit side of said bed, withdrawing product gas from said catalyst bed at a temperature in excess of about 980° F. but below about 1200° F., thereafter mixing a sufficient quantity of a gas containing free oxygen to react with the remaining unconverted hydrogen sulfide issuing from said catalyst bed to produce free sulfur, next cooling the resulting gaseous mixture to a temperature ranging from slightly above the dew point of the sulfur vapors contained therein up to about 625° F., conducting the cooled gaseous mixture through a second bed of catalyst for the oxidation of hydrogen sulfide to free sulfur wherein the temperature variation across said bed ranges from not less than about 300° F. on the inlet side to not more than about 1,200° F. on the exit side of said second bed, thereafter cooling the resulting sulfur-containing vapors, and withdrawing the cooled product.

5. The process of claim 4 in which said hydrogen sulfide containing gases are mixed with up to about 60–70% of the total oxygen required to convert said hydrogen sulfide to free sulfur and wherein the temperature variation across both the first and second catalyst beds ranges from not less than about 375° F. on the inlet side to not more than about 1,000° F. on the exit side of said beds.

6. The process of claim 4 in which the hydrogen sulfide-containing gas is sour natural gas.

7. The process of claim 4 in which natural gas hydrocarbons are present in said hydrogen sulfide-containing gases.

8. In a process for recovering free sulfur from hydrogen sulfide-containing gases by means of direct oxidation of hydrogen sulfide with a gas containing free oxygen and wherein said gases contain from about 10 to about 25 volume per cent hydrogen sulfide, the steps which comprise mixing said gases with a gas containing free oxygen, said oxygen being present in an amount ranging from about 60 to about 70 per cent of that theoretically required to react with all of the hydrogen sulfide present in said gases, heating the resulting mixture up to a temperature of from about 300° to about 500° F. and thereafter contacting said mixture with a fixed bed of catalyst capable of promoting the oxidation of hydrogen sulfide to free sulfur, the temperature variation across said bed ranging from not less than about 300° F. on the inlet side to not more than about 1,200 F. on the exit side of said bed, withdrawing product gas from said catalyst bed at a temperature in excess of about 980° F. but below about 1200° F., thereafter mixing a sufficient quantity of a gas containing free oxygen to react with the remaining unconverted hydrogen sulfide issuing from said catalyst bed to produce free sulfur, next cooling the resulting gaseous mixture to a temperature ranging from slightly above the dew point of the sulfur vapors contained therein up to about 625° F., conducting the cooled gaseous mixture through a second bed of catalyst for the oxidation of hydrogen sulfide to free sulfur wherein the temperature variation across said second bed ranges from, not less than slightly above the dew point of said sulfur vapors on the inlet side to not more than about 1,200° F. on the exit side thereof, thereafter cooling the resulting sulfur-containing vapors, and withdrawing the cooled product.

9. In a process for recovering free sulfur from hydrogen sulfide-containing gases by means of direct oxidation of hydrogen sulfide with a gas containing free oxygen and wherein said gases contain from about 10 to about 25 volume per cent hydrogen sulfide, the steps which comprise preheating said gases in a reactor up to a temperature ranging from about 300° to about 500° F. in the presence of sufficient oxygen to react with from about 60 to about 70 per cent of the hydrogen sulfide present in said gases, thereafter contacting the preheated mixture of gases with a fixed bed of catalyst capable of promoting the oxidation of hydrogen sulfide to free sulfur, the temperature variation across said bed ranging from not less than about 375° F. on the inlet side to not more than 1,000° F. on the exit side of said bed, withdrawing product gas from said catalyst bed at a temperature in excess of about 980° F. but below about 1200° F., thereafter mixing a sufficient quantity of a gas containing free oxygen to react with the remaining unconverted hydrogen sulfide issuing from said catalyst bed, cooling the resulting gaseous mixture to a temperature ranging from slightly above the dew point of the sulfur vapors contained therein up to about 625° F., conducting the cooled gaseous mixture through a second bed of catalyst for the oxidation of hydrogen sulfide to free sulfur, the temperature variation across said second bed ranging from not less than 375° F. on the inlet side to not more than 1,000° F. on the exit side of said bed, thereafter cooling the resulting sulfur-containing vapors, and withdrawing the cooled product from said reactor.

10. The process of claim 9 in which the hydrogen sulfide-containing gas is sour natural gas.

11. In a process for recovering free sulfur from a gaseous stream containing at least 10 volume per cent hydrogen sulfide by means of direct oxidation of hydrogen sulfide with a gas containing free oxygen, the steps which comprise mixing said gaseous stream with a gas containing free oxygen, said oxygen being present in an amount ranging from about 60 to about 70 per cent of that theoretically required to react with all of the hydrogen sulfide present in said stream, heating the resulting mixture up to a temperature of from about 300° to about 500° F., thereafter contacting the preheated mixture of gases with a fixed bed of catalyst capable of promoting the oxidation of hydrogen sulfide to free sulfur, the temperature variation across said bed ranging from not less than about 375° F. on the inlet side to not more than 1000° F. on the exit side of said bed, withdrawing product gas from said catalyst bed at a temperature in excess of about 980° F. but below about 1200° F., thereafter mixing a sufficient quantity of a gas containing free oxygen to react with the remaining unconverted hydrogen sulfide issuing from said catalyst bed to produce free sulfur, next cooling the resulting gaseous mixture to a temperature ranging from slightly above the dew point of the sulfur vapors contained therein up to about 625° F., conducting the cooled gaseous mixture through a second bed of catalyst for the oxidation of hydrogen sulfide to free sulfur, the temperature variation across said second bed ranging from not less than 300° F. on the inlet side to not more than 1200° F. on the exit side of said bed, thereafter cooling the resulting sulfur-containing vapors, and withdrawing the cooled product from said reactor.

References Cited in the file of this patent

UNITED STATES PATENTS

| | | |
|---|---|---|
| 731,758 | Daub | June 23, 1903 |
| 1,252,976 | Wells | Jan. 8, 1918 |
| 1,464,845 | Downs et al. | Aug. 14, 1923 |
| 1,922,872 | Thompson | Aug. 15, 1933 |
| 1,959,898 | Brode et al. | May 22, 1934 |
| 2,004,758 | Jaeger | June 11, 1935 |
| 2,042,468 | Houdry | June 2, 1936 |
| 2,200,529 | Baehr et al. | May 14, 1940 |
| 2,298,641 | Schulze et al. | Oct. 13, 1942 |
| 2,299,197 | West | Oct. 20, 1942 |
| 2,384,926 | Jones | Sept. 18, 1945 |
| 2,497,095 | Nevins et al. | Feb. 14, 1950 |
| 2,512,562 | Cummings | June 20, 1950 |
| 2,561,990 | Miller | July 24, 1951 |
| 2,581,135 | Odell | Jan. 1, 1952 |
| 2,630,374 | Miller | Mar. 3, 1953 |

FOREIGN PATENTS

| | | |
|---|---|---|
| 185,780 | Great Britain | Sept. 7, 1922 |
| 623,264 | Great Britain | May 16, 1949 |